United States Patent
Ataev et al.

(10) Patent No.: US 11,651,667 B2
(45) Date of Patent: May 16, 2023

(54) SYSTEM AND METHOD FOR DISPLAYING MOVING OBJECTS ON TERRAIN MAP

(71) Applicant: OOO ITV Group, Moscow (RU)

(72) Inventors: Alan Zhasharbekovich Ataev, Moscow (RU); Ivan Yurevich Kalugin, Balashikha (RU); Murat Kazievich Altuev, Moscow (RU)

(*) Notice: Subject to any disclaimer, the term of this patent is extended or adjusted under 35 U.S.C. 154(b) by 0 days.

(21) Appl. No.: 17/074,626

(22) Filed: Oct. 20, 2020

(65) Prior Publication Data
US 2021/0407270 A1    Dec. 30, 2021

(51) Int. Cl.
| | | |
|---|---|---|
| H04N 5/247 | (2006.01) | |
| G08B 13/196 | (2006.01) | |
| H04N 5/232 | (2006.01) | |
| G06V 20/40 | (2022.01) | |

(52) U.S. Cl.
CPC ....... *G08B 13/19682* (2013.01); *G06V 20/41* (2022.01); *G08B 13/1968* (2013.01); *H04N 5/23218* (2018.08); *H04N 5/23299* (2018.08); *H04N 5/247* (2013.01)

(58) Field of Classification Search
None
See application file for complete search history.

(56) References Cited

U.S. PATENT DOCUMENTS

| | | | | |
|---|---|---|---|---|
| 2018/0067593 | A1* | 3/2018 | Tiwari | G08B 13/22 |
| 2021/0004017 | A1* | 1/2021 | Colgate | G06K 9/6259 |
| 2021/0064216 | A1* | 3/2021 | Li | G06T 3/4038 |

* cited by examiner

*Primary Examiner* — Eileen M Adams
(74) *Attorney, Agent, or Firm* — Georgi Korobanov

(57) ABSTRACT

The invention refers to the area of data visualization on the terrain map, and more specifically to the analysis of video data received from cameras linked to an interactive terrain map for subsequent display in real time of all objects moving in the frame on the mentioned terrain map. A system for displaying the moving objects on the interactive terrain map comprising multiple video cameras, an object tracker, data processing and storage device that has a graphical user interface (GUI). GUI comprising a display unit, a unit for setting the interactive map, a unit for setting the video camera viewing angle. The data processing and storage device is configured to receive the video data from the video cameras, as well as metadata of all moving objects from the object tracker, analyze the received video data and object metadata, display the real image moving object in real time on an interactive map at location on the map where this object is currently moving. The image location on the map and the image of the moving object itself change in real time based on the video data and metadata of the moving object. The interactive map displays all moving objects that fall within the field of vision of any of the video cameras linked to the map, for which the user has preset the viewing angle.

27 Claims, 3 Drawing Sheets

SYSTEM AND METHOD FOR DISPLAYING MOVING OBJECTS ON TERRAIN MAP

RELATED APPLICATIONS

This application claims priority to Russian Patent Application No. RU 2020121090, filed Jun. 25, 2020, which is incorporated herein by reference in its entirety.

FIELD OF THE INVENTION

The invention refers to the area of data visualization on the terrain map, and more specifically to the analysis of video data received from cameras linked to an interactive terrain map for subsequent display in real time of all objects moving in the frame on the mentioned terrain map.

BACKGROUND

Video surveillance systems (security, control) are used to protect and control premises or areas. The mentioned security systems can be of very large scale, i.e. include both outdoor video surveillance and indoor control in the buildings. Automated video surveillance systems are used for huge areas to be monitored. In general, such systems are based on image processing and image recognition algorithms that allow analyzing video without direct involvement of a person. Depending on specific purposes, video surveillance systems can implement many functions, such as: object detection, tracking the movement of objects, object identification, search for objects of interest, etc.

The system operator is immediately notified whenever the video surveillance system detects a potentially dangerous situation or suspicious actions of objects in the frame. To make a decision on further actions to eliminate a potentially dangerous situation, the system operator watches video from one or multiple video cameras with the incident visible in their field of vision. However, moving objects, such as people or cars, usually move very quickly from the field of vision of one camera to that of another one. As a result, it may be not convenient for the system operator to quickly switch between different cameras and monitor the overall situation. When it comes to responding to a potentially dangerous situation in real time, it is very important to see the whole picture and not to miss a single detail. For such a case, it would be more informative and convenient to see the moving objects and all their actions directly on the terrain map, rather than switching between different cameras.

In the field of invention, there are various solutions that characterize the display of marks of the moving objects on the terrain map. An example is the mobile app "Yandex.Navigator" or a solution called "Yandex.Maps", which shows the location of all public transport in real time. It works as follows: each vehicle is equipped with GPS and GLONASS devices, which transmit signals about their location to the carrier server via mobile Internet every 20-60 seconds. Next, the system receives car ID, route number, type of transport (bus, trolleybus, train or minibus), signal time, and coordinates from the carriers. The system checks the vehicle (whether it is on its route or not) and, after a successful check, the vehicle is displayed on the map as a mark.

The main difference of this kind of solutions from the stated solution consists in the use of sensors to determine the objects' location. In this case, moving objects are only displayed on the map as marks. Such solutions are not clear enough for use in security systems, because it is difficult to recognize the full picture of what is happening on the basis of the marks.

As for the use of video cameras, from the field of invention, we know a solution disclosed in the U.S. Pat. No. 8,358,808 B2, pub. 22.01.2013, which describes the systems and methods for detecting and tracking the objects, such as cars, by video data. The systems and methods analyze video data to count objects, determine the speed of objects, and track the path of objects without relying on detection and identification of background data in the captured video data. The detection system applies one or multiple scan lines to create a spatio-temporal map, which is a temporal sequence of video data fragments displaying the history of pixel data corresponding to the scan line. The system detects objects in the video data based on the intersection of lines in the spatio-temporal map. The system detects an object and then records the detection to calculate and display the object in combination with the video data.

The main difference of this solution is lack of visual representation of moving objects on the terrain map. Besides, the known solution is rather complicated in implementation and is used only for vehicle tracking.

In technical terms, the closest known solution was disclosed in the patent RU 2703152 C1, pub. 15.10.2019, which describes the systems and methods for displaying a scheme of objects' movement across the controlled terrain. The system contains the following elements: multiple sensors and/or devices that determine specific position of objects at set points in time; a plan of the controlled site; a memory that stores an archive of data identifying objects at a specific location at a specific time; whereby this data is received from the sensors and/or devices in real time; an image display device; graphical user interface; a data input/output device; and at least one data processing device configured to perform the following stages: receiving a request and search criteria from the user through the graphical user interface to search for data about at least one object; searching for data about at least one object in the data archive; obtaining a dataset that characterizes the movement of at least one object over the controlled area; whereby data was received from different sensors and/or devices according to search criteria at different points in time; automatic plotting of a scheme of objects' movement on the plan of the controlled terrain according to the received dataset; display of the mentioned object movement scheme on the image display device.

The main difference of this solution consists in the fact that it is the archive data that is analyzed and received not only from video cameras, but also from other devices. Thus, the site plan can display only the scheme of object movement, and not the image of a real moving object in real time.

Thus, the main disadvantage of the previous field of invention is the lack of quick, accurate, and more informative real-time display of all moving objects on the terrain map, not only on the street, but also in the buildings. The solution stated by us allows the security system operator to track all moving objects by viewing only the map of the monitored area, and not the video data from multiple video cameras, with objects moving in their field of vision.

DISCLOSURE OF THE INVENTION

This technical solution is aimed to eliminate the disadvantages of the previous background of the invention and develop the existing solutions.

The technical result of the claimed group of inventions is real-time display of images of real moving objects on the interactive terrain map.

This technical result is achieved by the fact that the system for displaying the moving objects on the interactive terrain map comprise the following elements: several video cameras linked to the interactive map and configured to receive video data from their field of vision; an object tracker enabling to analyze video data from video cameras to form metadata of all moving objects; and at least one data processing and storage device that has a graphical user interface (GUI) containing at least the following data input and output tools: a display block configured to display an interactive terrain map in a two-dimensional (2D) or three-dimensional (3D) view; an interactive map layer configuration unit configured to allow the user adding individual layers to each floor of any multi-storey building on the interactive map, with each layer representing a separate mini-map of the floor, and each multi-storey building is presented as a three-dimensional object comprising of multiple layers on the full 3D interactive map; a unit for setting the camera viewing angle configured to allow the system user setting the viewing angle for each video camera linked to the interactive map; whereby the data processing and storage device is configured to: receive video data from video cameras and receive metadata of all moving objects from the object tracker; analyze the received video data and metadata of objects; display the real image of at least one moving object in real time on the interactive map, exactly in the location on the map where this object is currently moving; whereby the image location on the map and the image of the moving object itself change in real time based on video data and metadata of the moving object; whereby the interactive map displays all moving objects that fall into the field of vision of any of the video cameras linked to the map, for which the user has preset the viewing angle on the map.

This technical result is also achieved by means of the method for displaying the moving objects on the interactive terrain map performed by a computer system comprising, at least one data processing and storage device that has a graphical user interface (GUI) comprising data input and output tools; whereby the method comprise the stages at which the following operations are performed: displaying the interactive terrain map in a two-dimensional (2D) or three-dimensional (3D) view on the screen; providing the user with possibility to add the individual layers for each floor of any multi-storey building on the interactive map, with each layer representing a separate floor mini-map and each multi-storey building being presented as a three-dimensional object consisting of several layers on a full 3D interactive map; providing the user with possibility to link video cameras to the interactive map and set the viewing angle for the linked video cameras; receiving video data from the mentioned video cameras; analyzing the received video data by using an object tracker to generate metadata of all moving objects; analyzing the received metadata of moving objects; displaying the real image of at least one moving object in real time on the interactive map exactly in the location where the object is currently moving; whereby the image location on the map and the image of the moving object itself changes in real time based on video data and metadata of the moving object; whereby the interactive map displays all moving objects that fall into the field of vision of any of the video cameras linked to the map for which the user has preset the viewing angle on the map.

In one specific version of the stated solution, the display unit is configured to display the interactive map in two modes: mode of displaying the full 3D interactive map or mode of displaying the 2D mini map of the floor of any multi-storey building available on the interactive map; whereby as soon as the system user selects the layer of a particular floor of a particular multi-storey building, the interactive map switches from the mode of displaying the full 3D interactive map to the mode of displaying the 2D mini map of the selected floor; whereby the moving objects are displayed on the interactive map in any of possible display modes.

In another specific version of the stated solution, the display unit is configured to provide the system user with possibility to rotate, tilt, or change the scale of the displayed interactive map in any of possible display modes; whereby, at map scaling, all images of the moving objects are scaled in the same proportions.

In another specific version of the stated solution, if a moving object falls into the field of vision of multiple video cameras, the image of the moving object is automatically selected for displaying exactly from the video camera from which the best video of the moving object for a user-defined viewing angle or interactive map tilt angle was received.

In another specific version of the stated solution, in the case when the system user considers the movement of the moving object displayed on the interactive map suspicious, the GUI is configured in such a way as to give the system user the possibility to select the moving object on the interactive map, whereupon the full video opens from the video camera from which the video of the mentioned moving object was received.

In another specific version of the stated solution, the display unit displays the movement trajectories of all moving objects on the interactive map for a user-defined time interval; whereby the movement trajectories of different moving objects are displayed with different colors.

In another specific version of the stated solution, the object tracker divides all moving objects into the following categories during the video data analysis: person, vehicle, group of people.

In another specific version of the stated solution, if the video data analysis determines that the moving object is a person and recognizes the face of the mentioned person, the name and photo of this person from the database will be displayed next to their image on the interactive map.

In another specific version of the stated solution, if it is impossible to correctly and fully display video of the moving object at a user-defined scale and angle of tilt or turn of the interactive map, then its schematic image will be used for displaying based on the metadata of the mentioned moving object.

In another specific version of the stated solution, the interactive map is a terrain map or an open street map.

In another specific version of the stated solution, if the interactive map is the open street map, then the user can set the exact coordinates of camera location in the settings of each camera, whereupon it will be added to the interactive map at a preset point.

In another specific version of the stated solution, the GUI additionally contains a unit for setting the rules configured to provide the user with possibility to set rules for determining the situations or actions of the moving objects that will be considered dangerous or illegal.

In another specific version of the stated solution, once violation of at least one of the preset rules is detected, an icon for attracting the user's attention appears on the interactive map at the place of the accident; whereby the mentioned icon will blink red during the time interval preset by the user.

In another specific option of the claimed solution, whenever a violation of at least one of the preset rules is detected, at least one or a combination of user-defined actions is performed, such as: initiating an alarm, notification of the user by sins, notification of the user e-mail, audio notification of the user, recording video data from the place of incident to the archive, exporting a frame or video data.

This technical result is also achieved by means of a computer-readable data carrier which contains instructions, executed by the computer's processor, for the implementation of methods for displaying the moving objects on the interactive terrain map.

EMBODIMENT OF THE INVENTION

Description of the approximate embodiments of the claimed group of inventions is presented below. However, the claimed group of inventions is not limited only to these embodiments. It will be obvious to persons who are experienced in this field that other embodiments may fall within the scope of the claimed group of inventions described in the claim.

The claimed technical solution in its various implementation options can be implemented in the form of computer systems and methods for displaying the moving objects on the interactive terrain map, as well as in the form of a computer-readable data carrier.

Figure 1:
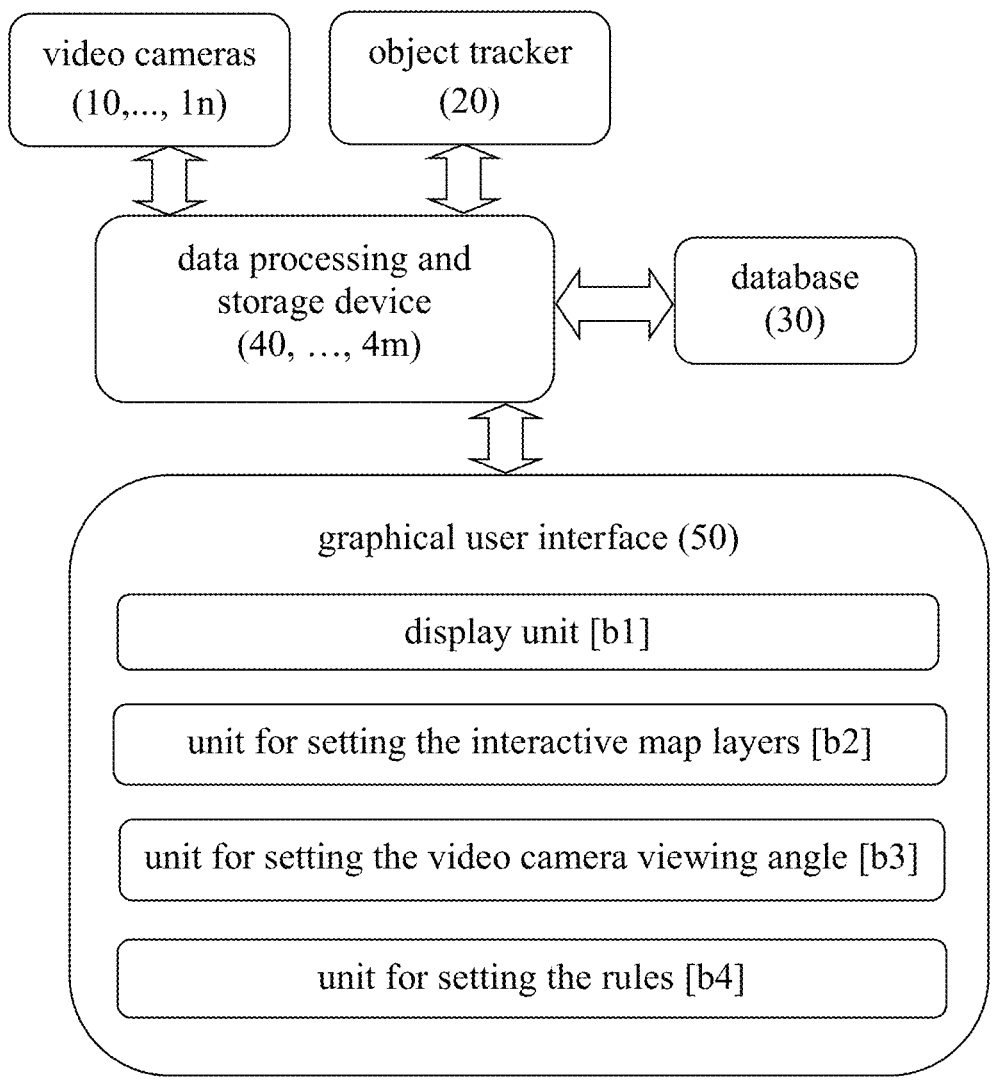
FIG. 1—block diagram of the system for displaying the moving objects on the interactive terrain map.

FIG. 1 shows a block diagram of one of the implementation options of the system for displaying the moving objects on the interactive terrain map. The mentioned system in its complete set includes: several video cameras (10, . . . , 1n) linked to the interactive terrain map; an object tracker (20); a database (30); and at least one data processing and storage device (30, . . . , 3m) with a graphical user interface (40) installed on it and containing at least the following data input and output tools: a display unit (b1), a unit for setting the interactive map layers (b2), a unit for setting the camera viewing angle (b3), and a unit for setting the rules (b4). Thus, video cameras, the object tracker, the database, and all the data processing and storage devices are combined into a single computing system by using a local network or via the Internet. It should be mentioned that even the minimum configuration of the system, which does not include the database and the unit for setting the rules in GUI is enough for achieving the stated technical result.

In this context, computer systems may be any hardware- and software-based interconnected technical means.

Video cameras linked to the interactive map are configured to receive real-time video data from their field of vision and transmit it over the network to at least one data processing and storage device.

The object tracker is a software algorithm for determining location of the moving objects in the video data. By using the mentioned tracker, it is possible to detect all moving objects in the frame and determine their specific spatial coordinates.

Data processing and storage device may be a computer, a laptop, a server, a tablet, etc. Thus, for the purpose of data processing, each mentioned device contains one or a combination of: processor, microprocessor, graphics processor, computer (electronic computer), PLC (programmable logic controller) configured to execute certain data processing commands (instructions, programs), and for data storage, the mentioned devices contain at least one of the following elements, without limitation: hard drives (HDD), flash memory, ROM (read-only memory), solid state drives (SSDs), optical drives, etc.

Graphical User Interface (GUI), installed on at least one data processing and storage device, is a system of data input and output tools to ensure user interaction with the computing device, based on the presentation of all system objects and functions available to the user in the form of graphic components on the screen (windows, icons, menus, buttons, lists, panels, etc.). Thus, the user has random access via data input/output devices to all visible screen objects—interface units—which are displayed on the display. For example, data input devices can be, but are not limited to, mouse, keyboard, touchpad, stylus, joystick, trackpad, etc.

It should be noted that the described system may also include any other devices known in the background of the invention, such as sensors of various types, data input/output devices, display devices, etc.

An example of the above mentioned system for displaying the moving objects on the interactive terrain map will be described in detail below.

Let's consider a large security system, for example, in a business camp. It should be mentioned that the security system can be similarly configured for absolutely any protected area, ranging from one premise/building to the entire district or city. There are several multi-storey buildings in the protected territory. CCTV cameras are placed both on the street and inside the buildings (on all floors, in all premises that should be monitored).

The interactive terrain map is used to monitor the business camp territory and, accordingly, track the movement of all objects moving across it. In general, the interactive map is an electronic map showing the information linked to the geographical context. In the context of this application, the interactive map is a site plan or an open street map. Thus, a site plan is a type of a topographical map or drawing of a small plot of land at a given scale which is an image in a publicly available format. An open street map, in its turn, is configured on the basis of geo-information system (GIS) data and can be edited (depending on the user's requirements and interests).

All video cameras of the system are linked to the mentioned interactive map. And in the case when the interactive map is an Open Street Map (OSM), the user can set the exact coordinates of the camera location in its settings. Thereupon, each camera will be added to the interactive map at a preset point.

As mentioned earlier, the system cameras are configured to receive real-time video data from their field of vision. The mentioned cameras are preferably placed in such a way as to fully cover the entire premise/territory; thus, the fields of vision of the cameras may slightly overlap/overlay to get a full picture. Thus, at subsequent analysis of the videos, it is easy to detect various moving or stationary objects, track the objects' trajectories, identify objects, search for objects of interest, get a good one or several images of interest from the video data, and perform many other required actions. All installed cameras are connected over the network (local or global) to one or multiple data processing and storage devices; in this case—to the server. In addition, all installed cameras are linked to the terrain map. The cameras are linked by the administrator, before starting the system operation.

Thus, in one of the implementation options, the video cameras may contain an object tracker configured to generate the object metadata. Alternatively, if the system uses the simplest video cameras, the object tracker may be installed on one of the data processing and storage devices, for example, on the server. The object tracker is configured for processing and analyzing the video data received from the system video cameras, as well as for generating the metadata of all moving objects in the frame. Metadata is detailed data on all objects moving within the field of vision of each camera (location, movement trajectories, facial descriptors, vehicle registration numbers, clothing descriptors, etc.). The received object metadata are stored in the system memory together with the corresponding video data to enable further analysis using the archive data. It should be mentioned that, in one of the possible implementation options, the object tracker divides all detected moving objects into the following categories during the video data analysis: person, vehicle, group of people.

When all security devices are installed in the territory and configured properly, the user, or rather the system administrator, starts to configure the display of data on the interactive map of the site. After all, accuracy and speed of detecting potentially dangerous incidents, as well as the speed of response depend on the clarity of data on the map. To configure the displayed data, GUI installed on the user's computer contains the necessary data input and output means (see FIG. 1), which will be discussed in more detail below.

Figure 2:
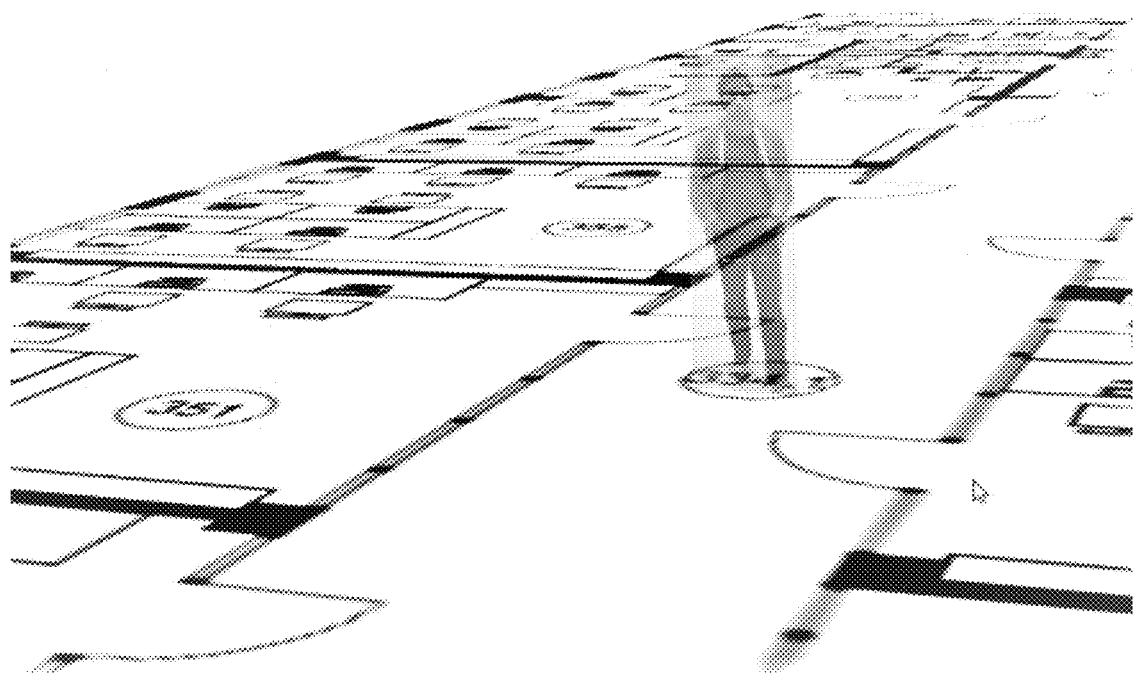
FIG. 2—example of displaying the moving object on the mini-map of a floor in a multi-storey building.

The display unit [b1] is configured to display the interactive terrain map in two-dimensional (2D) or three-dimensional (3D) form. Initially, the terrain map is displayed in 2D form. However, for more detail and better visibility, it would be good to see multi-storey buildings in 3D. To achieve this goal, the GUI contains a unit for setting the layers on the interactive map [b2], which is configured to enable the system user adding separate layers for each floor of any multi-storey building on the interactive map. In this case, each layer represents a separate 2D mini-map of a floor, while on the entire 3D interactive map, each multi-storey building is displayed as a three-dimensional object consisting of several layers. Thus, the operator adds separate layers for each multi-storey building and consequently for each floor during the system setup. Most often, the mini-map of a floor (layer) is a floor plan. Such a solution will be useful and convenient to control the situation not only on the street but also in the buildings. FIG. 2 shows a mini floor plan of one building.

Also, the GUI contains a unit for setting the camera viewing angle [b3] configured to enable the system user to set a viewing angle for each camera linked to the interactive map. This stage is necessary because the interactive map displays only those moving objects that fall into the field of vision of any of the cameras linked to the map, with a viewing angle preset by the user.

Thus, at least one data processing and storage device, for example, a computer or a server performs the basic steps necessary for the entire system to display the moving objects on the interactive map. Namely, the said computer or server receives the video data from all linked cameras and metadata of all moving objects from the object tracker in real time. Then the received video data and object metadata are analyzed. During the analysis, standard video data processing operations such as object detection, recognition, object image acquisition, etc. are performed.

The final stage is displaying the real image of at least one moving object at its exact current location on the interactive map in real time. Thus, the image location on the map and the image of the moving object itself change in real time, based on the video data and metadata received from the moving object. It should be mentioned that the real image of the object (or, to put it simply, a track) is a rectangular area of the video data frame, in which the object movement is detected.

The display unit [b1] is configured to display the interactive map in two modes: full 3D interactive map display mode or 2D mini-map display of a floor of any multi-storey building available on the interactive map. Let's imagine, for example, that the user's screen displays a complete interactive 3D map of the site, which has several multi-storey buildings. If the user wants to see, for example, what's going on on the 3rd floor of a certain building, then the system user selects (clicks) the layer of a certain floor (in this example of the third floor) of a certain multi-storey building. Thereupon, the interactive map switches from the mode of displaying the full 3D interactive map to the mode of displaying 2D mini-map of selected floor, with the objects moving on this floor displayed on it. FIG. 2 shows an example of displaying the moving object on a 2D mini-map of a multi-storey building floor. It is easy to see on the map that one of the business camp employees is walking along the hall. It should be mentioned that the moving objects 'images are displayed on the interactive map in any of possible display modes, but it is logical to use the full map to display people on the street, while it is better to use the mini-map of the floor to display people inside the building, because moving objects are displayed in the map scale.

In one of specific options of the system implementation, the display unit [b1] is additionally configured to enable the system user to rotate, tilt, or change the scale of the displayed interactive map in any of two possible display modes (i.e. to perform any actions which can be performed with a three-dimensional object). Thus, when scaling the map, all images of the moving objects displayed on it are scaled in the same proportions as the map.

In addition, if the user rotates the map and the moving object track is detected by several cameras at the same time, the user can switch from one camera to another for a better representation of the moving object on the terrain map. In other words, if the moving object falls into the field of vision of multiple cameras, the moving object image is automatically selected from the camera, from which the best video of the moving object for the user-defined rotation or tilt angle of the interactive map has been received. For example, if the video data from camera 1 clearly shows a person walking (i.e. a person in full height and their hands and face are visible), and the video data from camera 2 shows the back of this person's head (because the person has already passed camera 2), then the image of the person from camera 1 is automatically selected for displaying.

Also, let's imagine a situation when the system operator noticed some suspicious situation or suspicious actions/movements of a moving object while viewing the interactive map. For example, two people fight or a person goes to a dangerous zone. For such a case, the GUI is configured to enable the system user to select the moving object on the interactive map (by clicking on it with the mouse), whereupon the full video opens from the video camera from which the image of the mentioned moving object has been received. Using these video data, the system operator can easily and quickly understand the situation and take the necessary security measures.

It should also be mentioned that, in one of specific implementation options, the system is additionally configured to display the trajectories of all moving objects on the map. Namely, the trajectories of all moving objects are displayed in the display unit [b1] on the interactive map for a time interval preset by the system user. Thus, the movement trajectories of different moving objects are displayed in different colors. Let's assume that the operator wants to see who of the employees entered the room from which the equipment disappeared on May 26, 2020. In the GUI, the operator sets the time interval of interest, for example, from 8:00 to 13:00, because at 13:00 a loss has already been detected. Thereupon, the user can see the trajectories of all objects moving on the site on the terrain map and determine who of the employees and at what time entered the room. Then, when viewing the video data, it is easy to confirm the theft and take appropriate actions.

As mentioned earlier, the object tracker divides all moving objects into three categories during the video data analysis: (1) a person, (2) a vehicle, and (3) a group of people. In this case, when the video data analysis determines that the moving object is a person (1), the system tries to recognize their face. This may be an employee of the guarded business camp. If the face of the said person is recognized, their name and photo from the database are displayed on the interactive map next to the person's image. The person's position, or any other preset information from the employee database, may also be displayed. It should be mentioned that the database is stored on at least one data processing and storage device, such as a server.

There are situations when it is impossible to correctly and fully display the image (track) of the moving object based on the user-defined scale and angle of tilt or rotation of the interactive map. For example, if the operator is looking at the street from above. In such a case, the schematic image of the moving object will be used for displaying it on the map based on the analyzed metadata of the mentioned moving object.

It's commonly known that automated security systems are usually configured in such a way that it is possible to set certain criteria or rules for determining potentially dangerous trajectories of objects. The GUI of the system stated by us, in one of specific implementation options, additionally contains a unit for setting the rules [b4] configured to enable the system user to set rules for determining the situations or actions of moving objects that should be considered dangerous or illegal. Such rules for determining which object movements are suspicious may be at least as follows: the fact that there is a crossing of the object's path and some surface in the object coordinate space; the fact of falling of at least one object trajectory in some area in the object coordinate space; the fact of leaving of a certain area by trajectory of at least one object in the object coordinate space; the fact of emergence of trajectory of at least one object in a certain area in the object coordinate space; the fact of disappearance of trajectory of at least one object from a certain area in the object coordinate space; the fact of starting the movement by at least one object in a certain area in the object coordinate space; that fact of stops of at least one object in a certain area in the object coordinate space; determination of the duration of presence of at least one object in a certain area in the object coordinate space; the fact of simultaneous presence of several objects in a certain area, etc.

When the system operator sets all necessary rules/criteria, the System starts to automatically check movements of all objects in real time. Whenever a violation of at least one of the preset rules is detected (for example, if a person has crossed a preset line—a graphic primitive), an icon appears on the interactive map to attract the user's attention. It can be an icon (!) or any other mark defined by the user. If the system operator has preset the alarm time interval, the mentioned icon (!) will blink red (or any other preset color) during the set time interval.

In addition, at least one or a combination of preset user-defined actions will be performed additionally upon detection of violation of at least one of the preset rules. These actions may be as follows: initiation of an alarm, notification of the user by sins, notification of the user by e-mail, audio notification of the user, recording video data from the place of incident to an archive, exporting a frame or video data. All these actions help system operators to react quickly to potentially dangerous situations. For example, if the system operator was distracted or left the workplace for a short while and during this time the system detected a violation, the operator will receive SMS notification and an audio notification on his work computer. In this case, the icon (!) flashes on the interactive map at the place of incident. In addition, the notification can be sent not only to the operator, but also immediately to the security service staff.

Figure 3:
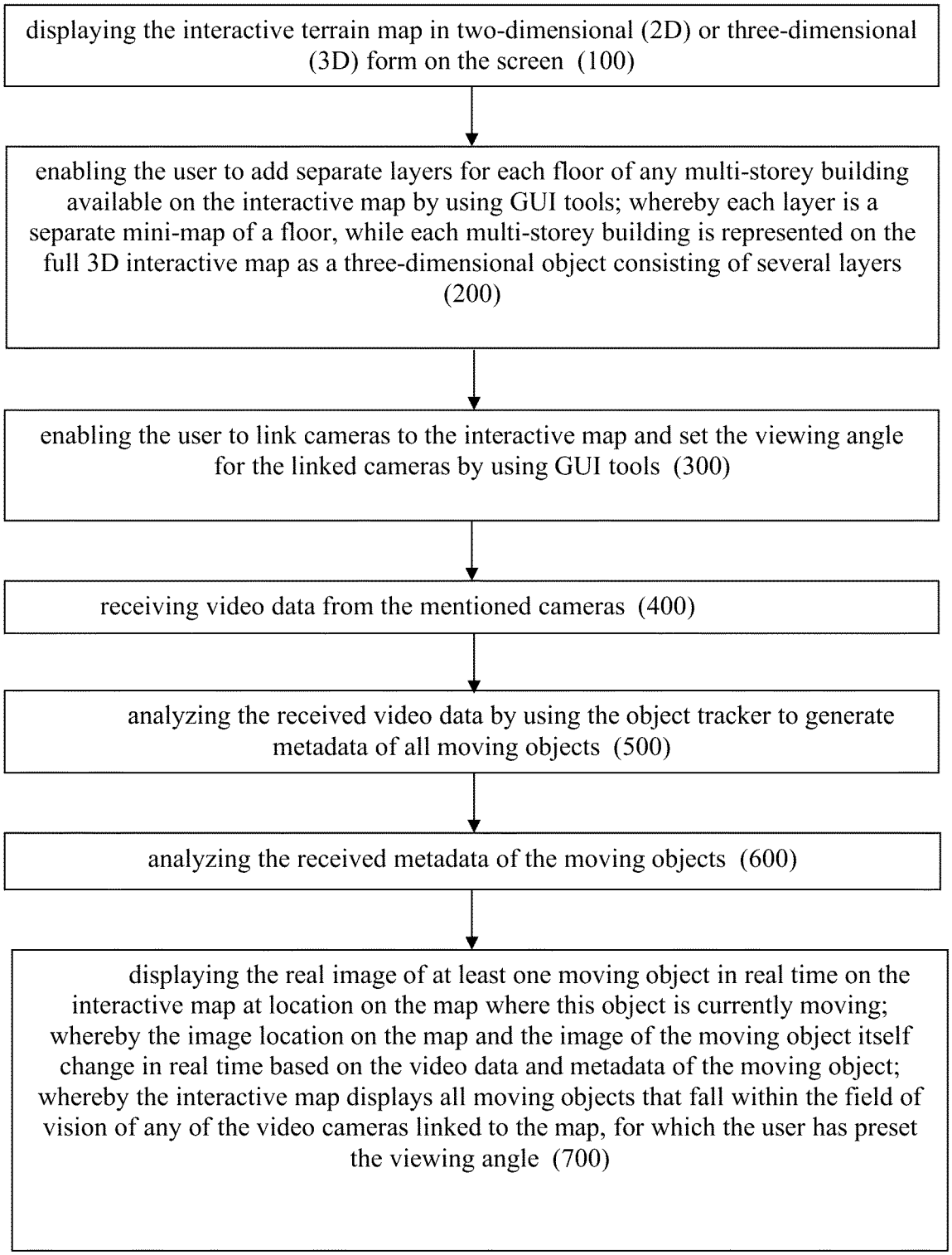
FIG. 3—block diagram of one of the implementation options of the method for displaying the moving objects on the interactive terrain map.

FIG. 3 shows a block diagram of one of the implementation options of the method for displaying the moving objects on the interactive terrain map. This method is performed by a computer system containing at least one data processing and storage device with a GUI (Graphic User Interface), which contains data input and output tools. Thus, the specified method contains stages at which the following operations are executed:

(100) displaying the interactive terrain map in two-dimensional (2D) or three-dimensional (3D) form on the screen;

(200) enabling the user to add separate layers for each floor of any multi-storey building available on the interactive map by using GUI tools; whereby each layer is a separate mini-map of a floor, while each multi-storey building is represented on the full 3D interactive map as a three-dimensional object consisting of several layers;

(300) enabling the user to link cameras to the interactive map and set the viewing angle for the linked cameras by using GUI tools;

(400) receiving video data from the mentioned cameras;

(500) analyzing the received video data by using the object tracker to generate metadata of all moving objects;

(600) analyzing the received metadata of the moving objects;

(700) displaying the real image of at least one moving object in real time on an interactive map at location on the map where this object is currently moving; whereby the image location on the map and the image of the moving object itself change in real time based on the video data and metadata of the moving object; whereby the interactive map displays all moving objects that fall within the field of vision of any of the video cameras linked to the map, for which the user has preset the viewing angle.

It should be noted once again that this method can be implemented by means of the system described earlier to display the moving objects on the interactive terrain map and therefore can be expanded and refined by all specific embodiment options described above for implementation of the system for displaying the moving objects on the interactive terrain map.

Besides, the embodiment options of this group of inventions can be implemented with the use of software, hardware, software logic, or their combination. In this embodiment example, software logic, software, or a set of instructions are stored on one or multiple various conventional computer-readable data carriers.

In the context of this description, a "computer-readable data carrier" may be any environment or medium that can contain, store, transmit, distribute, or transport the instructions (commands) for their application (execution) by a computer device, such as a personal computer. Thus, a data carrier may be an energy-dependent or energy-independent machine-readable data carrier.

If necessary, at least some part of the various operations presented in the description of this solution can be performed in an order differing from the described one and/or simultaneously with each other.

Although the technical solution has been described in detail to illustrate the most currently required and preferred embodiments, it should be understood that the invention is not limited to the embodiments disclosed and, moreover, is intended to modify and combine various other features of the embodiments described. For example, it should be understood that this invention implies that, to the possible extent, one or more features of any embodiment option may be combined with one or more other features of any other embodiment option.

The invention claimed is:

1. A system for displaying moving objects on an interactive terrain map comprising:
    video cameras linked to an interactive map and configured to receive video data from their respective fields of vision;
    an object tracker configured to analyze video data from the video cameras to generate metadata of all moving objects; and
    a data processing and storage device comprising a graphical user interface (GUI) comprising at least the following data input and output tools:
        a display unit configured to display the interactive map in two-dimensional (2D) or three-dimensional (3D) form;
        a unit for setting the interactive map configured to enable a user to add separate layers for each floor of any multi-storey building available on the interactive map by using GUI tools; whereby each layer is a separate mini-map of a floor, while each multi-storey building is represented on the full 3D interactive map as a three-dimensional object consisting of several layers;
        a unit for setting the video camera viewing angle configured to enable the system user to set a viewing angle for each camera linked to the interactive map;
    whereby the data processing and storage device is configured to: receive the video data from the video cameras, as well as metadata of all moving objects from the object tracker;
    analyze the received video data and object metadata;
    display the real image of at least one moving object in real time on an interactive map at location on the map where this object is currently moving; whereby the image location on the map and the image of the moving object itself change in real time based on the video data and metadata of the moving object;
    whereby the interactive map displays all moving objects that fall within the field of vision of any of the video cameras linked to the map, for which the user has preset the viewing angle; and
    wherein the display unit is configured to provide the system user with possibility to rotate, tilt, or change the scale of the displayed interactive map in any of possible display modes; whereby, at map scaling, all images of the moving objects are scaled in the same proportions.

2. The system according to claim 1, wherein the display unit is configured to display the interactive map in two modes: full 3D interactive map display mode or 2D mini-map display of a floor of any multi-storey building available on the interactive map,
    whereby as soon as the system user selects the layer of a particular floor of a particular multi-storey building, the interactive map switches from the mode of displaying the full 3D interactive map to the mode of displaying the 2D mini map of the selected floor;
    whereby the moving objects are displayed on the interactive map in any of possible display modes.

3. The system according to claim 1, wherein the moving object falls into the field of vision of multiple cameras, the moving object image is automatically selected from the camera, from which the best video of the moving object for the user-defined rotation or tilt angle of the interactive map has been received.

4. The system according to claim 3, wherein when it is impossible to correctly and fully display video of the moving object at a user-defined scale and angle of tilt or turn of the interactive map, then schematic image of the moving object is used for displaying based on metadata of the moving object.

5. The system according to claim 1, wherein when the system user considers the movement of the moving object displayed on the interactive map of interest, the GUI is configured to allow the system user to select the moving object on the interactive map, whereupon the full video opens from the video camera from which the video of the selected moving object on the interactive map was received.

6. The system according to claim 5, wherein the GUI additionally contains a unit for setting the rules configured to provide the user with possibility to set rules for determining the situations or actions of the moving objects that will be considered dangerous or illegal.

7. The system according to claim 6, wherein when a violation of at least one of the preset rules is detected, an icon for attracting the user's attention appears on the interactive map at the place of the accident; whereby the icon will blink red during the time interval preset by the user.

8. The system according to claim 6, wherein the whenever a violation of at least one of the preset rules is detected, at least one or a combination of user-defined actions is performed, such as: initiating an alarm, notification of the user by sms, notification of the user by e-mail, audio notification of the user, recording video data from the place of incident to the archive, exporting a frame or video data.

9. The system according to claim 1, wherein the display unit displays the movement trajectories of all moving objects on the interactive map for a user-defined time interval; whereby the movement trajectories of different moving objects are highlighted with different colors.

10. The system according to claim 1, wherein the object tracker divides all moving objects at least into the following categories during the video data analysis: human person, vehicle, group of people.

11. The system according to claim 10, wherein when the video data analysis determines that a category of the moving object is a human person and recognizes the face of the moving object, the name and photo of this moving object from the database will be displayed next to their image on the interactive map.

12. The system according to claim 1, wherein the interactive map is a site plan or an open street map.

13. The system according to claim 12, wherein when the interactive map is the open street map, then the user can set the exact coordinates of camera location in the settings of each camera, whereupon the camera location is added to the interactive map at a preset point.

14. A method for displaying the moving objects on an interactive terrain map performed by a computer system comprising a data processing and storage device with installed graphical user interface (GUI) comprising data input and output tools; whereby the method comprises the stages at which the following operations are performed:
   displaying the interactive terrain map in two-dimensional (2D) or three-dimensional (3D) form on the screen;
   enabling the user to add separate layers for each floor of any multi-storey building available on the interactive map by using GUI tools; whereby each layer is a separate mini-map of a floor, while each multi-storey building is represented on the full 3D interactive map as a three-dimensional object consisting of several layers;
   enabling the user to link cameras to the interactive map and set the viewing angle for the linked cameras by using GUI tools;
   receiving video data from the cameras;
   analyzing the received video data by using the object tracker to generate metadata of all moving objects;
   analyzing the received metadata of the moving objects;
   displaying the real image of at least one moving object in real time on the interactive map at location on the map where this object is currently moving; whereby the image location on the map and the image of the moving object itself change in real time based on the video data and metadata of the moving object;
   whereby the interactive map displays all moving objects that fall within the field of vision of any of the video cameras linked to the map, for which the user has preset the viewing angle; and
   wherein the display unit is configured to provide the system user with possibility to rotate, tilt, or change the scale of the displayed interactive map in any of possible display modes; whereby, at map scaling, all images of the moving objects are scaled in the same proportions.

15. The method according to claim 14, wherein the interactive map can be displayed in two modes: full 3D interactive map display mode or 2D mini-map display of a floor of any multi-storey building available on the interactive map,
   whereby as soon as the system user selects the layer of a particular floor of a particular multi-storey building, the interactive map switches from the mode of displaying the full 3D interactive map to the mode of displaying the 2D mini map of the selected floor;
   whereby the moving objects are displayed on the interactive map in any of possible display modes.

16. The method according to claim 14, wherein the moving object falls into the field of vision of multiple cameras, the moving object image is automatically selected from the camera, from which the best video of the moving object for the user-defined rotation or tilt angle of the interactive map has been received.

17. The method according to claim 16, wherein when it is impossible to correctly and fully display video of the moving object at a user-defined scale and angle of tilt or turn of the interactive map, then schematic image of the moving object is used for displaying based on metadata of the moving object.

18. The method according to claim 14, wherein when the system user considers the movement of the moving object displayed on the interactive map of interest, the GUI is configured to allow the system user to select the moving object on the interactive map, whereupon the full video opens from the video camera from which the video of the selected moving object on the interactive map was received.

19. The method according to claim 18, wherein the GUI additionally contains a unit for setting the rules configured to provide the user with possibility to set the rules for determining the situations or actions of the moving objects that will be considered dangerous or illegal.

20. The method according to claim 19, wherein when a violation of at least one of the preset rules is detected, an icon for attracting the user's attention appears on the interactive map at the place of the accident; whereby the icon will blink red during the time interval preset by the user.

21. The method according to claim 19, wherein whenever a violation of at least one of the preset rules is detected, at least one or a combination of user-defined actions is performed, such as: initiating an alarm, notification of the user by sms, notification of the user by e-mail, audio notification of the user, recording video data from the place of incident to the archive, exporting a frame or video data.

22. The method according to claim 14, wherein the interactive map displays the movement trajectories of all moving objects on the interactive map for a user-defined time interval; whereby the movement trajectories of different moving objects are highlighted with different colors.

23. The method according to claim 14, wherein the object tracker divides all moving objects at least into the following categories during the video data analysis: human person, vehicle, group of people.

24. The method according to claim 23, wherein when the video data analysis determines that a category of the moving object is a human person and recognizes the face of the moving object, the name and photo of this moving object from the database will be displayed next to their image on the interactive map.

25. The method according to claim 14, wherein the interactive map is a site plan or an open street map.

26. The method according to claim 25, wherein when the interactive map is the open street map, then the user can set the exact coordinates of camera location in the settings of each camera, whereupon the camera location is added to the interactive map at a preset point.

27. A non-transitory computer readable data carrier comprising instructions executed by a computer processor for implementing the methods for displaying the moving objects on the interactive terrain map according to claim 14.

* * * * *